United States Patent
Ishihara et al.

(10) Patent No.: US 11,054,331 B2
(45) Date of Patent: Jul. 6, 2021

(54) METHOD AND DEVICE FOR DETECTING MALFUNCTION OF ELECTROSTATIC-CAPACITANCE PRESSURE SENSOR

(71) Applicant: AZBIL CORPORATION, Chiyoda-ku (JP)

(72) Inventors: Takuya Ishihara, Chiyoda-ku (JP); Masaru Soeda, Chiyoda-ku (JP); Masashi Sekine, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 280 days.

(21) Appl. No.: 16/251,437

(22) Filed: Jan. 18, 2019

(65) Prior Publication Data

US 2019/0226936 A1 Jul. 25, 2019

(30) Foreign Application Priority Data

Jan. 23, 2018 (JP) .............................. JP2018-008635

(51) Int. Cl.
*G01L 27/00* (2006.01)
*G01L 9/00* (2006.01)

(52) U.S. Cl.
CPC .......... *G01L 27/007* (2013.01); *G01L 9/0075* (2013.01)

(58) Field of Classification Search
CPC ... G01L 9/0075; G01L 27/005; G01L 27/007; G01L 19/02; G01L 11/008
See application file for complete search history.

(56) References Cited

U.S. PATENT DOCUMENTS 5,515,711 A * 5/1996 Hinkle .................. G01L 27/005
73/1.58
5,836,063 A * 11/1998 Hegner ................. G01L 9/0075
29/25.42

(Continued)

FOREIGN PATENT DOCUMENTS

JP       2000-105164 A       4/2000
JP       2006-003234 A       1/2006

(Continued)

OTHER PUBLICATIONS

Korean Office Action dated Dec. 18, 2019, in Patent Application No. 10-2019-0003094, 7 pages.

*Primary Examiner* — Tran M. Tran
(74) *Attorney, Agent, or Firm* — Oblon, McClelland, Maier & Neustadt, L.L.P.

(57) ABSTRACT

An electrode pair that forms a pressure-sensitive capacitance Cx in the central portion of a diaphragm is called a first electrode pair (pressure-sensing electrode pair), and another electrode pair that forms a reference capacitance Cr in the circumferential portion of the diaphragm is called a second electrode pair (reference electrode pair). The ratio $\Delta Cx/\Delta Cr$ of a change $\Delta Cx$ in the pressure-sensitive capacitance Cx, which is obtained from the pressure-sensing electrode pair at the time of evacuation, to a change $\Delta Cr$ in the reference capacitance Cr, which is obtained from the reference electrode pair at the time of evacuation, is calculated as an index for malfunction detection $\alpha$. Then, the index for malfunction detection $\alpha$ thus calculated is compared with the reference value $\alpha$ref, which represents the index observed during normal operation, and whether deformation due to a cause other than pressure has been generated in the diaphragm is determined.

14 Claims, 12 Drawing Sheets

(56) References Cited

U.S. PATENT DOCUMENTS

| | | | | |
|---|---|---|---|---|
| 6,122,973 | A * | 9/2000 | Nomura | G01L 9/0075 73/724 |
| 6,295,875 | B1 * | 10/2001 | Frick | G01L 9/0075 73/718 |
| 6,311,563 | B1 * | 11/2001 | Ishikura | G01L 9/0075 73/724 |
| 6,341,527 | B1 * | 1/2002 | Ishikura | G01L 9/0075 73/718 |
| 6,389,371 | B1 * | 5/2002 | Tsuchiya | G01L 27/002 702/98 |
| 6,411,107 | B1 * | 6/2002 | Ishikura | G01L 9/0072 73/862.626 |
| 6,606,911 | B2 * | 8/2003 | Akiyama | G01L 9/0072 73/720 |
| 6,647,795 | B2 * | 11/2003 | Suzuki | G01L 1/144 73/718 |
| 7,047,815 | B2 * | 5/2006 | Sashinami | G01L 9/0075 73/718 |
| 7,325,457 | B2 * | 2/2008 | Fujimori | B60C 23/0408 361/283.1 |
| 7,401,524 | B2 * | 7/2008 | Yoshikawa | G01L 9/125 73/718 |
| 7,706,995 | B2 * | 4/2010 | Sullivan | G01L 9/0072 702/85 |
| 7,918,135 | B2 * | 4/2011 | Hammerschmidt | B60C 23/0408 73/718 |
| 8,656,787 | B2 * | 2/2014 | Ishihara | G01L 9/0075 73/724 |
| 8,887,575 | B2 * | 11/2014 | Blankenship | G01N 27/227 73/724 |
| 8,997,548 | B2 * | 4/2015 | Ferran | G01L 27/005 73/1.66 |
| 9,383,282 | B2 * | 7/2016 | Besling | G01L 9/0042 |
| 9,470,773 | B2 * | 10/2016 | Uehlin | G01L 9/0072 |
| 9,677,964 | B2 * | 6/2017 | Ferran | G01L 27/005 |
| 9,689,770 | B2 * | 6/2017 | Hammerschmidt | G01L 9/0073 |
| 9,778,302 | B2 * | 10/2017 | Wurzinger | H04R 19/04 |
| 9,791,340 | B2 * | 10/2017 | Bilic | G01L 9/0042 |
| 10,006,829 | B2 * | 6/2018 | Tochigi | G01L 9/0072 |
| 10,458,870 | B2 * | 10/2019 | Gu | G01L 9/0072 |
| 10,564,059 | B2 * | 2/2020 | Okada | G01L 5/161 |
| 2009/0301211 | A1 * | 12/2009 | Yoshikawa | G01L 27/007 73/724 |
| 2012/0206147 | A1 * | 8/2012 | Sim | G01K 7/34 324/457 |
| 2014/0150559 | A1 * | 6/2014 | Ishihara | G01L 19/147 73/718 |
| 2017/0248487 | A1 | 8/2017 | Ishihara et al. | |

FOREIGN PATENT DOCUMENTS

| | | |
|---|---|---|
| JP | 2010-236949 A | 10/2010 |
| JP | 2015-184064 A | 10/2015 |
| KR | 10-2017-0101789 A | 9/2017 |

* cited by examiner

METHOD AND DEVICE FOR DETECTING MALFUNCTION OF ELECTROSTATIC-CAPACITANCE PRESSURE SENSOR

CROSS-REFERENCE TO RELATED APPLICATIONS

The present application is based on and claims priority to Japanese Application No. 2018-008635, filed Jan. 23, 2018, the entire contents of which are incorporated herein by reference.

BACKGROUND

1. Field

The present disclosure relates to a method and device for detecting malfunction of an electrostatic-capacitance pressure sensor including a sensor element having a diaphragm structure, the sensor element being configured to detect electrostatic capacitance in accordance with the pressure of a medium to be measured.

2. Description of the Related Art

A sensor element having a small diaphragm fabricated by using so-called microelectromechanical systems (MEMS) technology has typically been adopted for a pressure sensor, such as a vacuum gauge used in a semiconductor manufacturing facility or the like. Such a sensor element is based mainly on the detection principle that displacement or stress generated in a diaphragm that receives the pressure of a pressure medium is converted into a signal of some kind.

For example, an electrostatic-capacitance pressure sensor is widely known as a pressure sensor that uses a sensor element of this type. In an electrostatic-capacitance pressure sensor, a diaphragm elastically deforms when subjected to the pressure of a medium to be measured, and the displacement of the diaphragm is detected as a change in electrostatic capacitance (change in capacitance between electrodes).

Such electrostatic-capacitance pressure sensors are extensively used for industrial applications, for example, in semiconductor manufacturing facilities because pressure measurement is unaffected by gas species. For example, an electrostatic-capacitance pressure sensor is used to measure the pressure of a gas during a manufacturing process in an apparatus such as a semiconductor manufacturing apparatus. The electrostatic-capacitance pressure sensor described above is called a diaphragm vacuum gauge of an electrostatic capacitance type in such applications. A diaphragm that elastically deforms when subjected to the pressure of a medium to be measured is called a pressure-sensing diaphragm or a sensor diaphragm (for example, refer to Japanese Unexamined Patent Application Publications No. 2010-236949, No. 2000-105164, and No. 2006-3234).

It is known that major applications of the diaphragm vacuum gauge, which is capable of measuring pressure in a manner unaffected by gas species, include film deposition processes, such as chemical vapor deposition (CVD), atomic layer deposition (ALD), and sputtering, and etching processes using plasma in semiconductor manufacturing processes and the like. Various problems are caused by deposits formed in varying degrees in chambers, pipes, and pumps. Such deposits include a film deposited on a substrate and an imperfect film similar to the film deposited on the substrate, which are formed during film deposition processes, and also include substances such as resist residues and by-products created when a substrate is etched, which are formed during etching processes.

Of these deposits, deposits in a diaphragm vacuum gauge used to measure and control gas pressure during a process, particularly the substances mentioned above deposited on a diaphragm that detects pressure, generate, in the diaphragm, deformation that is due to stress caused by the deposits and that is unrelated to the pressure to be measured. Such deformation causes a zero point shift, which is a shift from zero indicated by a diaphragm vacuum gauge when a chamber is evacuated to the limit.

In addition, the thickness of a diaphragm effectively increases to an extent that depends on the film quality of deposits. This effective increase in thickness reduces the amount of deformation for the same amount of applied pressure, leading to a decrease in pressure sensitivity. Further, in a case where a deposited substance is viscous or in similar cases, the movement of a diaphragm is sometimes delayed, which leads directly to a delay in sensor response.

It is known that a zero point shift in a pressure output and a change in pressure sensitivity, which are caused by such deposits in a vacuum gauge, naturally affect the quality of film deposition and etching to a great extent because pressure is a major control parameter for film deposition and etching.

Thus, an existing technique adopts the following adjustments when a zero point shift exceeds a predetermined specific value.

Adjustment 1: Adjust the zero point after the entire system has been evacuated to the limit.

Adjustment 2: If the system cannot be evacuated to the limit in Adjustment 1 or the like, the vacuum gauge is removed from the system and recalibrated.

However, the pressure reached by evacuating the system to the limit also depends on the pumping capability of a vacuum pump, the arrangement of pipes, and other factors. An observed zero point shift is sometimes due to an actual degradation in the degree of vacuum while the vacuum gauge is operating properly. Thus, the method using Adjustments 1 and 2 described above has the following problems.

Adjustment 1 problem: A properly operating vacuum gauge is subjected to an unnecessary zero point adjustment, resulting in an incorrect pressure measurement.

Adjustment 2 problem: If a vacuum gauge is removed from the system, the system halts operation for a long period because of an unnecessary zero point adjustment.

Although reducing the frequency of such adjustments as much as possible helps to improve the availability of the system, it is very difficult to distinguish between a case where the pressure has actually changed (zero point adjustment unnecessary) and a case where the zero point has shifted due to deposits or the like (zero point adjustment necessary).

Japanese Unexamined Patent Application Publication No. 2015-184064 discloses a method that suppresses a zero point shift as follows. A step portion is formed between the peripheral portion and the central portion on the surface on a pressure introduction chamber side of a diaphragm, and the diaphragm is divided into a region on the central-portion side (thin region) and a region on the peripheral-portion side (thick region) at the step portion serving as the boundary. A plurality of pressure introduction holes are located in a pedestal plate so that the openings of the plurality of pressure introduction holes are positioned in the vicinity of the step portion of the diaphragm (in the region on the peripheral-portion side). However, this method is only effective in suppressing a zero point shift.

The present disclosure addresses the foregoing issues and provides a method and device for detecting malfunction of an electrostatic-capacitance pressure sensor. The method and device are capable of distinguishing between an output change due to pressure and an output change due to a cause other than pressure, such as deposits, and reducing the frequency of unnecessary zero point adjustments.

SUMMARY

To address the foregoing issues, the present disclosure provides a method for detecting malfunction of an electrostatic-capacitance pressure sensor, the method being configured to detect malfunction of an electrostatic-capacitance pressure sensor (100) including a plurality of electrode pairs (D1 and D2) that each form a capacitance between electrodes, the capacitance being formed to change in accordance with displacement of a diaphragm (101) that is to deform in response to a pressure of a medium to be measured, and the method includes an index calculation step (S201) of calculating an index for malfunction detection ($\alpha$) in accordance with changes in capacitance (Cx and Cr) of the plurality of electrode pairs, the changes being observed when the medium to be measured is removed by evacuation and a state determination step (S202) of determining whether deformation due to a cause other than pressure has been generated in the diaphragm by comparing the index for malfunction detection calculated in the index calculation step with a reference value ($\alpha$ref) that represents the index for malfunction detection observed during normal operation.

In the present disclosure, whether deformation due to a cause other than pressure has been generated in a diaphragm is determined by calculating an index for malfunction detection by using the changes in capacitance of a plurality of electrode pairs observed when a medium to be measured is removed by evacuation and by comparing the index for malfunction detection thus calculated with a reference value, which represents the index for malfunction detection observed during normal operation. For example, when an electrode pair, which is called a first electrode pair, forms a pressure-sensitive capacitance Cx in the central portion of the diaphragm and another electrode pair, which is called a second electrode pair, forms a reference capacitance Cr in the circumferential portion of the diaphragm, the ratio $\Delta Cx/\Delta Cr$ of the change $\Delta Cx$ in the pressure-sensitive capacitance Cx to the change $\Delta Cr$ in the reference capacitance Cr is calculated as an index for malfunction detection $\alpha$. Then, whether deformation due to a cause other than pressure has been generated in the diaphragm is determined by comparing the index for malfunction detection $\alpha$ thus calculated with the reference value $\alpha$ref, which represents the index for malfunction detection observed during normal operation.

In this way, an output change due to pressure can be distinguished from an output change due to a cause other than pressure, such as deposits, and the frequency of unnecessary zero point adjustments can be reduced.

An electrode pair, which is called a first electrode pair and forms a deposition-sensitive capacitance Cd, may be disposed at a position corresponding to an inlet through which the medium to be measured is introduced to the diaphragm, and the ratio $\Delta Cd/\Delta Cr$ of the change $\Delta Cd$ in the deposition-sensitive capacitance Cd to the change $\Delta Cr$ in the reference capacitance Cr may be calculated as an index for malfunction detection $\beta$. Then, whether deformation due to a cause other than pressure has been generated in the diaphragm may be determined by comparing the index for malfunction detection $\beta$ thus calculated with the reference value $\beta$ref, which represents the index for malfunction detection observed during normal operation.

Further, an electrode pair, which is called a third electrode pair and forms a deposition-sensitive capacitance Cd, may be disposed at a position corresponding to an inlet through which the medium to be measured is introduced to the diaphragm, and the ratio $\Delta Cx/\Delta Cr$ of the change $\Delta Cx$ in the pressure-sensitive capacitance Cx to the change $\Delta Cr$ in the reference capacitance Cr and the ratio $\Delta Cd/\Delta Cr$ of the change $\Delta Cd$ in the deposition-sensitive capacitance Cd to the change $\Delta Cr$ in the reference capacitance Cr may be calculated as indexes for malfunction detection $\alpha$ and $\beta$, respectively. Then, whether deformation due to a cause other than pressure has been generated in the diaphragm may be determined by comparing the indexes for malfunction detection $\alpha$ and $\beta$ thus calculated with the reference values $\alpha$ref and $\beta$ref, respectively, which represent the indexes for malfunction detection observed during normal operation.

In the foregoing description, as an example, reference letters and numerals in parentheses indicate components depicted in the drawings, and the components depicted in the drawings correspond to elements of the present disclosure.

As described above, according to the present disclosure, an index for malfunction detection is calculated by using the changes in capacitance of a plurality of electrode pairs observed when a medium to be measured is removed by evacuation. Then, whether deformation due to a cause other than pressure has been generated in a diaphragm is determined by comparing the index for malfunction detection thus calculated with a reference value, which represents the index for malfunction detection observed during normal operation. Thus, an output change due to pressure can be distinguished from an output change due to a cause other than pressure, such as deposits, and the frequency of unnecessary zero point adjustments can be reduced.

DETAILED DESCRIPTION

Figure 1:
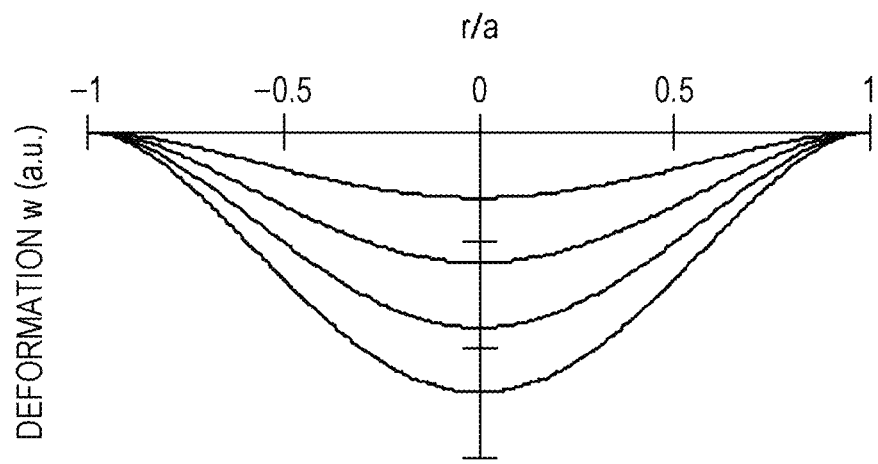
FIG. 1 depicts curves illustrating the amount of deformation of a circular diaphragm having a uniform thickness when pressure is applied to the diaphragm.

Hereinafter, embodiments of the present disclosure will be described in detail with reference to the drawings. First, the principle of the present disclosure will be described before describing the embodiments.
Principle of Present Disclosure The present inventors have found that deformation of a diaphragm due to pressure (proper deformation) and deformation of a diaphragm due to a cause other than pressure (improper deformation), such as deposits, have different forms of deformation. Normally, the form of a sensor diaphragm subjected to pressure is formulated as the amount of deformation w(r) of a circular disk that is fixed at the circumference and that is subjected to uniform pressure, as represented by Equation 1 below, and the amount of deformation w caused by the pressure p is represented by a quartic function of the distance r from the center of the diaphragm (refer to FIG. 1).

$$w(r) = \frac{3p(1-v^2)(a^2-r^2)^2}{16Eh^3} \quad (1)$$

where p is pressure, E is Young's modulus of the base material, v is Poisson's ratio of the base material, h is diaphragm thickness, a is diaphragm radius, and r is distance from the center of the diaphragm.

In many cases, a pressure-sensitive capacitance Cx and a reference capacitance Cr are formed in a cavity of an electrostatic-capacitance pressure sensor, and the electrostatic-capacitance pressure sensor provides the difference Cx−Cr as an output (sensor output) so as to suppress the temperature characteristics due to thermal expansion and contraction, reduce electrical noise, and remove the effect of a change in the permittivity in the cavity.

Figure 2:
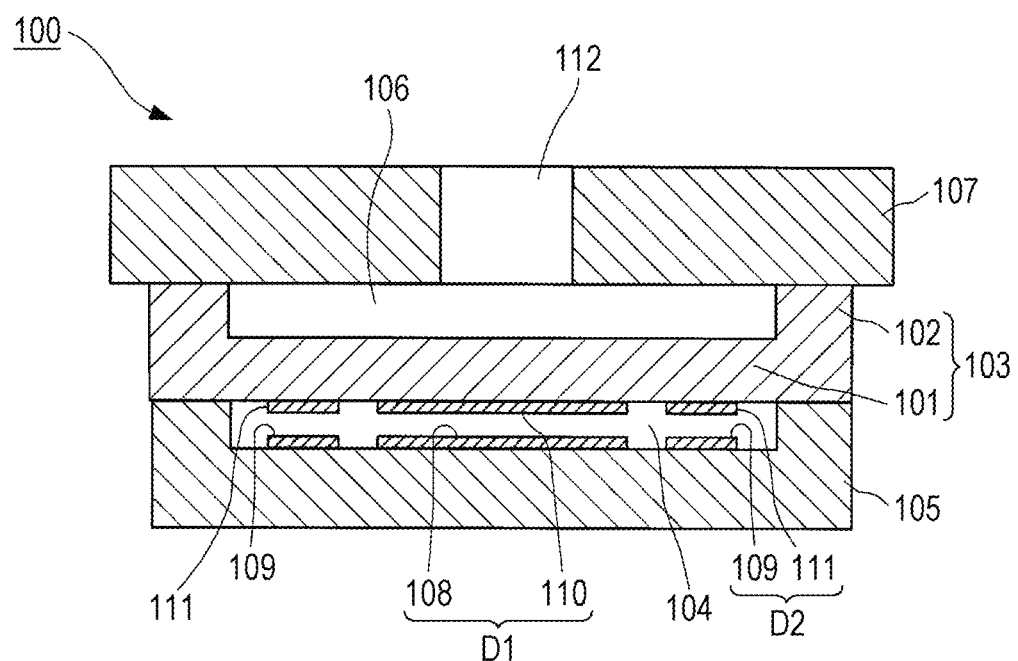
FIG. 2 depicts the structure of major components of an example of an electrostatic-capacitance pressure sensor to which the present disclosure is to be applied.

FIG. 2 depicts the structure of major components of an example of an electrostatic-capacitance pressure sensor to which the present disclosure is to be applied. An electrostatic-capacitance pressure sensor 100 includes a diaphragm assembly 103, a sensor pedestal 105, and a pedestal plate 107. The diaphragm assembly 103 includes a diaphragm 101 that is to deform in response to the pressure of a medium to be measured and a diaphragm support member 102 that supports the peripheral portion of the diaphragm 101. The sensor pedestal 105 is joined to the diaphragm support member 102 and constitutes a reference vacuum chamber (cavity) 104 in combination with the diaphragm 101. The pedestal plate 107 is joined to the other side of the diaphragm support member 102 from the sensor pedestal 105 and constitutes a pressure introduction chamber 106 in combination with the diaphragm 101.

In the electrostatic-capacitance pressure sensor 100, a pressure-sensing fixed electrode 108 and a reference fixed electrode 109 are formed on the surface on the reference vacuum chamber 104 side of the sensor pedestal 105, and a pressure-sensing movable electrode 110 and a reference movable electrode 111 are formed on the surface on the reference vacuum chamber 104 side of the diaphragm 101. The pressure-sensing fixed electrode 108 and the pressure-sensing movable electrode 110 are disposed on the central portion of the diaphragm 101 so as to face each other, and the reference fixed electrode 109 and the reference movable electrode 111 are disposed on the circumferential portion of the diaphragm 101 so as to face each other. A pressure introduction hole 112 is formed in the central portion of the pedestal plate 107 (the central portion is located directly above the center of the diaphragm 101).

Figure 3:
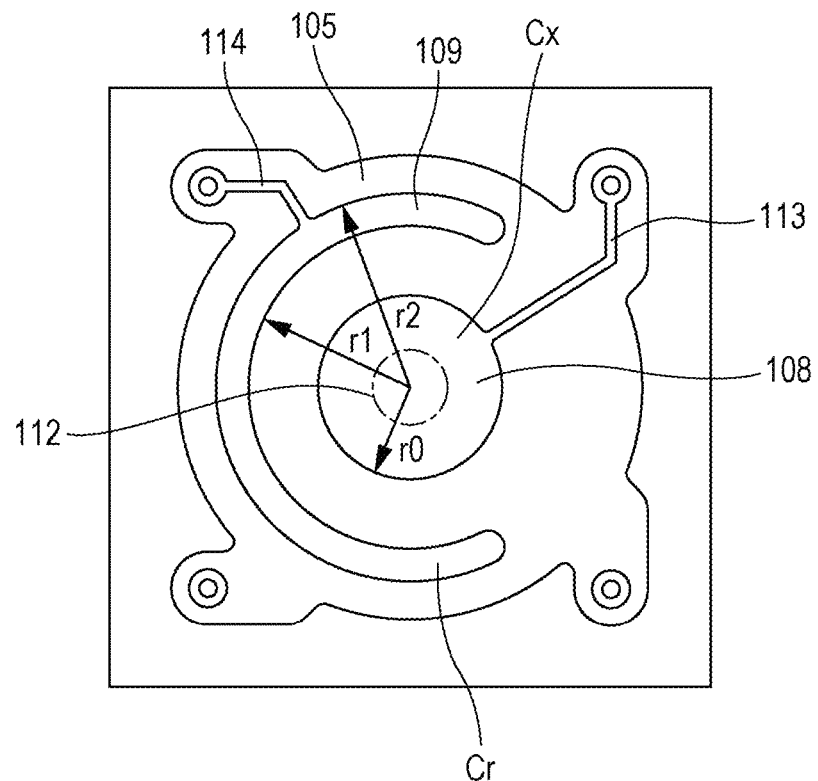
FIG. 3 depicts the arrangement of a pressure-sensing fixed electrode and a reference fixed electrode, which are formed on a sensor pedestal, together with the position of a pressure introduction hole in this electrostatic-capacitance pressure sensor.

FIG. 3 depicts the arrangement of the pressure-sensing fixed electrode 108 and the reference fixed electrode 109, which are formed on the sensor pedestal 105, together with the position of the pressure introduction hole 112. The pressure-sensing fixed electrode 108, which has a substantially circular shape in plan view, is formed on the surface on the reference vacuum chamber 104 side of the sensor pedestal 105 so that the center of the pressure-sensing fixed electrode 108 substantially coincides with the center of the diaphragm 101 in plan view. The reference fixed electrode 109, which has a substantially arc-like shape in plan view, is formed on the surface on the reference vacuum chamber 104 side of the sensor pedestal 105 so as to be arranged substantially concentrically outside the pressure-sensing fixed electrode 108. The pressure-sensing fixed electrode 108 is electrically connected via a wiring pattern 113 formed on the sensor pedestal 105 to a signal processing apparatus (not shown) placed outside the pressure sensor. Similarly, the reference fixed electrode 109 is electrically connected to the signal processing apparatus via a wiring pattern 114 formed on the sensor pedestal 105.

The configuration of the movable electrodes on the diaphragm 101 is similar to the configuration of the fixed electrodes. Specifically, the pressure-sensing movable electrode 110, which has a substantially circular shape in plan view, is formed on the surface on the reference vacuum chamber 104 side of the diaphragm 101 so as to face the pressure-sensing fixed electrode 108. The center of the pressure-sensing movable electrode 110 substantially coincides with the center of the diaphragm 101 in plan view. The reference movable electrode 111, which has a substantially arc-like shape in plan view, is formed on the surface on the reference vacuum chamber 104 side of the diaphragm 101 so as to face the reference fixed electrode 109. The reference movable electrode 111 is arranged substantially concentrically outside the pressure-sensing movable electrode 110. The pressure-sensing movable electrode 110 is electrically connected to the signal processing apparatus, which is placed outside the pressure sensor, via a wiring pattern (not shown) formed on the diaphragm 101. Similarly, the reference movable electrode 111 is electrically connected to the signal processing apparatus via a wiring pattern (not shown) formed on the diaphragm 101.

The electrostatic capacitance formed by the pressure-sensing fixed electrode 108 and the pressure-sensing movable electrode 110 has high sensitivity to pressure and performs a function of measuring pressure. The electrostatic capacitance formed by the reference fixed electrode 109 and the reference movable electrode 111 has low sensitivity to pressure and performs a function such as compensating for the permittivity between the electrodes. Following, the electrode pair constituted by the pressure-sensing fixed electrode 108 and the pressure-sensing movable electrode 110 is referred to as a pressure-sensing electrode pair D1, and the electrode pair constituted by the reference fixed electrode 109 and the reference movable electrode 111 is referred to as a reference electrode pair D2. The pressure-sensing electrode pair D1 forms a pressure-sensitive capacitance Cx in the central portion of the diaphragm 101, and the reference electrode pair D2 forms a reference capacitance Cr in the circumferential portion of the diaphragm 101.

In the electrostatic-capacitance pressure sensor 100, when a medium to be measured is introduced to the pressure introduction chamber 106 through the pressure introduction hole 112 in a direction intersecting the surfaces of the diaphragm 101 (direction perpendicular to the surfaces of the diaphragm 101 in this example), the diaphragm 101 deforms in response to the pressure of the medium to be measured. When the diaphragm 101 deforms, the distance between the sensor pedestal 105 and the diaphragm 101 (height of the reference vacuum chamber 104) changes, and the pressure-sensitive capacitance Cx formed by the pressure-sensing electrode pair D1 and the reference capacitance Cr formed by the reference electrode pair D2 change. The signal processing unit (not shown) calculates Cx–Cr as a sensor output and converts this sensor output (capacitance value) into a pressure value.

The base components that constitute the electrostatic-capacitance pressure sensor 100, which are the diaphragm assembly 103, the sensor pedestal 105, and the pedestal plate 107, are made of a heat- and corrosion-resistant material, such as sapphire, alumina ceramics, glass, silicon, nickel alloy, or stainless steel.

The pressure-sensitive capacitance Cx and the reference capacitance Cr of the electrostatic-capacitance pressure sensor 100 are given by Equations 2-1 and 2-2 as follows.

$$Cx = 2\pi \int_0^{r_0} \frac{\varepsilon_0 r dr}{d_0 - w(r)} \tag{2-1}$$

$$Cr = 2\pi \int_{r_1}^{r_2} \frac{\varepsilon_0 r dr}{d_0 - w(r)} \tag{2-2}$$

where $d_0$ is cavity depth, $\varepsilon_0$ is vacuum permittivity, r0 is Cx radius, r1 is Cr inner radius, and r2 is Cr outer radius.

In Equations 2-1 and 2-2, the amount of deformation w(r) due to the pressure is rigorously defined by Equation 1 described above, and the ratio $\Delta Cx/\Delta Cr$ between the respective changes in capacitance due to the pressure (ratio of the change $\Delta Cx$ in the pressure-sensitive capacitance Cx to the change $\Delta Cr$ in the reference capacitance Cr) is approximately constant in a region of a small amount of deformation w, for which a zero point adjustment is necessary.

In contrast, for changes in capacitance due to a cause other than pressure, in particular, changes in capacitance due to deposition of a film during a process, the ratio does not necessarily take the same value as above. For example, as depicted in FIG. 4, the thickness of a film (deposited film) 115 deposited on the diaphragm 101 varies depending on a position relative to the position of the pressure introduction hole 112, and thus the amount of deformation w generated by the deposited film varies in various ways.

Figure 4:
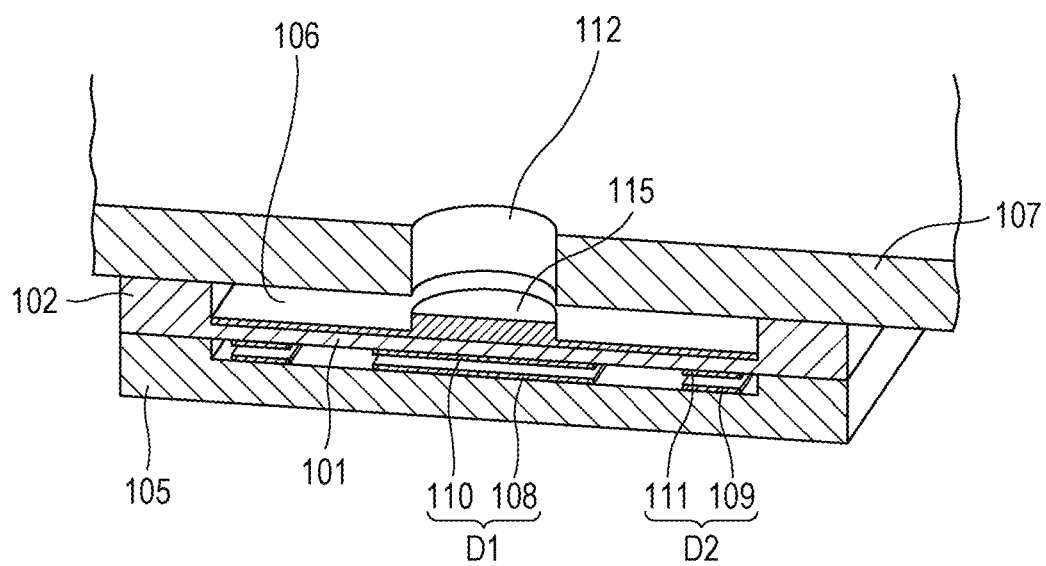
FIG. 4 depicts a state in which a deposited film is formed on the diaphragm of this electrostatic-capacitance pressure sensor.
Figure 5:
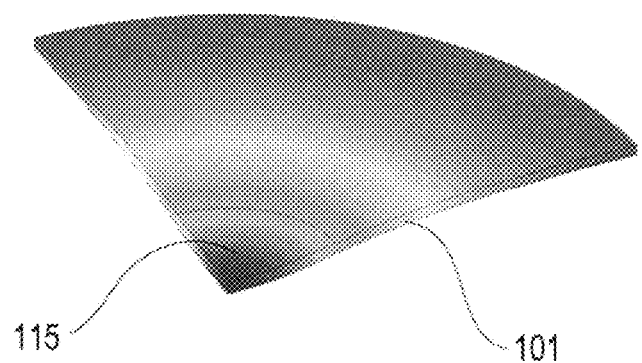
FIG. 5 depicts a calculation result (quarter model) illustrating the diaphragm of this electrostatic-capacitance pressure sensor whose central portion deforms to a great extent due to the deposited film when the deposition depicted in FIG. 4 occurs.

Specifically, as depicted in FIG. 4, if the film 115 is deposited so as to be thicker directly below the pressure introduction hole 112 (in the central portion of the diaphragm 101), the portion of the diaphragm 101 where the deposited film 115 is thicker deforms to a greater extent due to stress of the film (refer to FIG. 5), and the ratio of the change in Cx to the change in Cr ($\Delta Cx/\Delta Cr$) is expected to take a value that differs from a value for the film subjected to pressure.

Thus, the present inventors realized that the frequency of unnecessary zero point adjustments can be reduced by distinguishing (or separating) a signal due to a proper form of deformation from a signal due to an improper form of deformation in accordance with signal patterns obtained from a plurality of electrode pairs that each form a capacitance between electrodes and whose capacitance changes in accordance with displacement of a diaphragm that is to deform in response to the pressure of a medium to be measured.

Specifically, the present inventors realized that whether deformation due to a cause other than pressure has been generated in a diaphragm can be determined by calculating an index for malfunction detection by using changes in capacitance of a plurality of electrode pairs observed when a medium to be measured is removed by evacuation and by comparing the index for malfunction detection thus calculated with a reference value, which represents the index for malfunction detection observed during normal operation.

Outline of Embodiments

In the embodiments, the following functions are provided as basic requirements.
1. A plurality of capacitances are formed in a cavity.
2. There is provided a mechanism to measure and store not only an output simply due to an increase or a decrease in capacitance, but also a signal based on a form of deformation of a diaphragm.
3. Measurement and storage are performed in advance regarding a signal pattern obtained from a plurality of electrode pairs (reference pattern), the signal pattern being based on a form of deformation of a diaphragm due to applied pressure (proper form of deformation). For example, for a circular disk having a uniform thickness, the amount of deformation due to applied pressure is given by a quartic function of the distance from the center of the disk.
4. While an actual process expected to generate a zero point shift due to a cause other than pressure, such as deposition on a diaphragm, is performed, a signal pattern obtained from a plurality of electrode pairs (actual measured pattern) is acquired.
5. A signal based on a proper form of deformation is distinguished from a signal based on an improper form of deformation in accordance with the reference pattern and the actual measured pattern, and whether the signal is based on a proper form or an improper form of deformation is reported.

Figure 13:
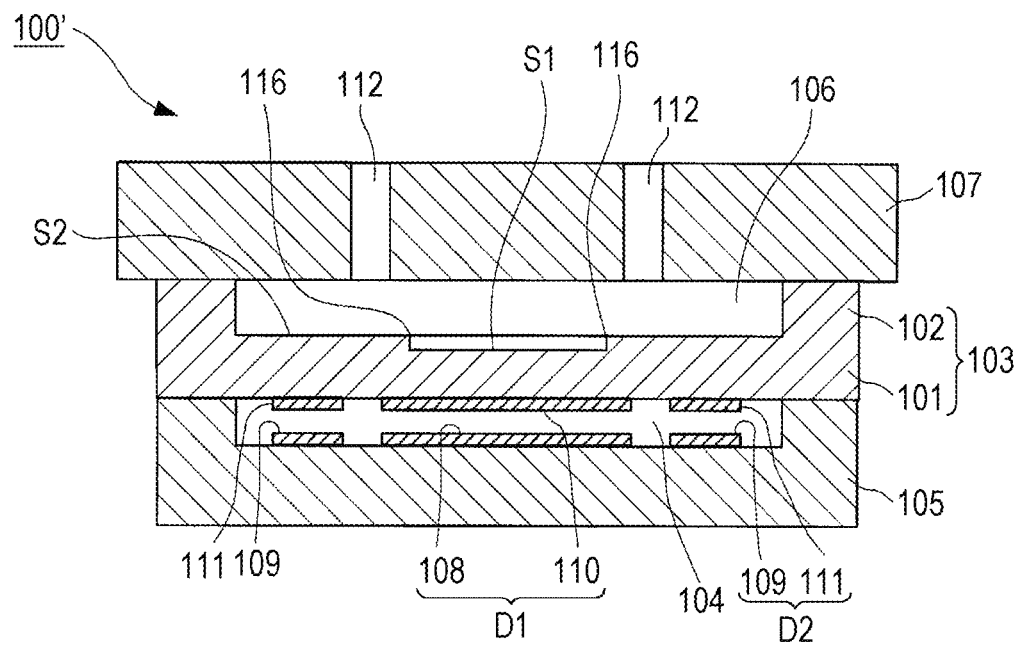
FIG. 13 depicts the structure of major components of another example of an electrostatic-capacitance pressure sensor to which the present disclosure is to be applied.

Two examples of the electrostatic-capacitance pressure sensor will be described in the following embodiments. One is an electrostatic-capacitance pressure sensor that has a pressure introduction hole at a position facing the central portion of a diaphragm surface (the electrostatic-capacitance pressure sensor 100, which has the structure depicted in FIG. 2), and the other is an electrostatic-capacitance pressure sensor that has a plurality of pressure introduction holes at distributed positions that do not face the central portion of a diaphragm surface (an electrostatic-capacitance pressure sensor 100', which has the structure depicted in FIG. 13 and will be described below). The example applied to the electrostatic-capacitance pressure sensor 100, which has the structure depicted in FIG. 2, will be described in a first embodiment, and the example applied to the electrostatic-capacitance pressure sensor 100', which has the structure depicted in FIG. 13, will be described in a second embodiment.

Figure 6:
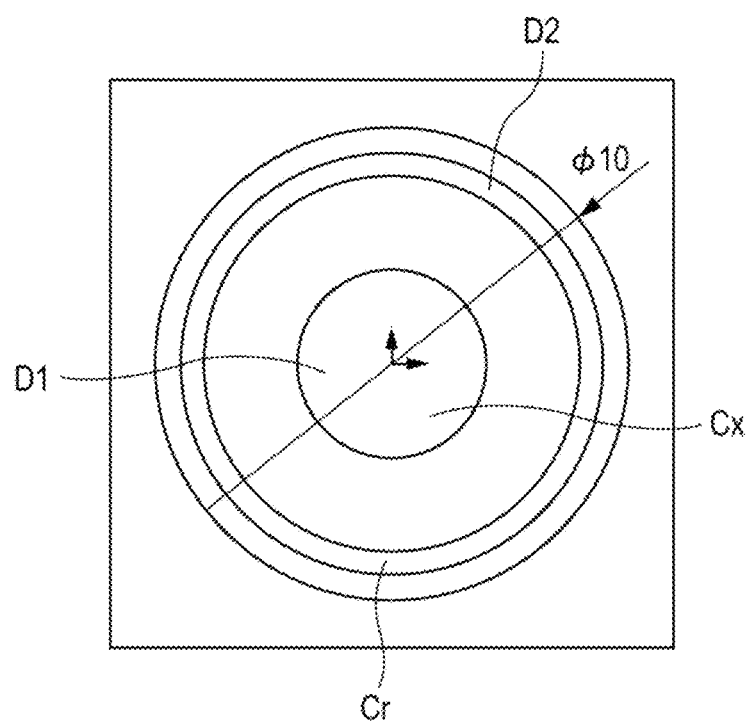
FIG. 6 depicts the arrangement of a pressure-sensing electrode pair and a reference electrode pair in this electrostatic-capacitance pressure sensor.

First Embodiment: Example of Performing Signal Processing by using Ordinary Cx and Cr For the electrostatic-capacitance pressure sensor 100, which has the structure depicted in FIG. 2, if size and material parameters are provided as follows as a specific example, the pressure-sensing electrode pair D1 and the reference electrode pair D2 are arranged as depicted in FIG. 6.

Size and Material Parameters

Young's modulus of diaphragm E: 350 GPa, Poisson's ratio of diaphragm ν: 0.25, diaphragm thickness h: 50 μm, diaphragm radius a: 5 mm, cavity depth $d_0$: 2 μm, vacuum permittivity: $8.854 \times 10^{-12}$ F/m, Cx radius: 2.005 mm, Cr inner radius: 3.997 mm, and Cr outer radius: 4.471 mm.

Figure 7:
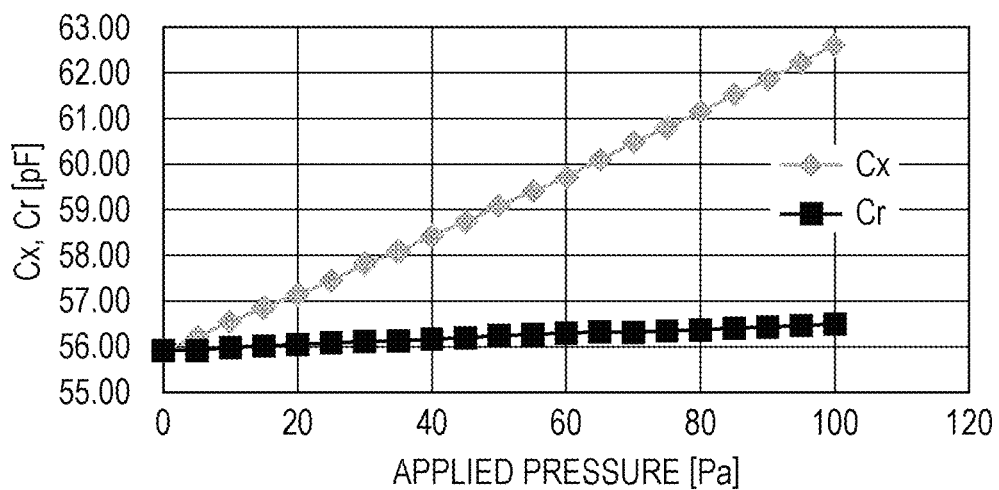
FIG. 7 is a graph illustrating calculated values of pressure-sensitive capacitance Cx and reference capacitance Cr with respect to applied pressure.
Figure 8:
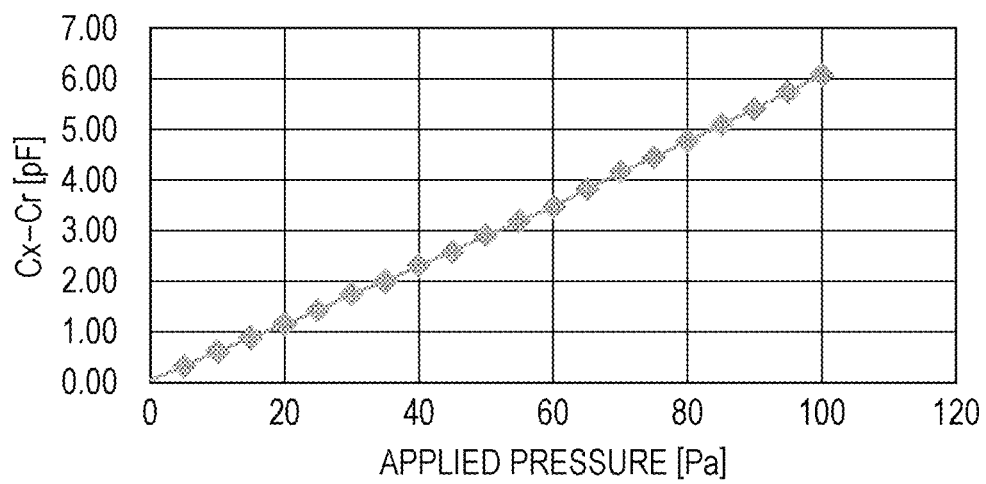
FIG. 8 is a graph illustrating calculated values of Cx−Cr with respect to applied pressure.

In this case, the pressure-sensitive capacitance Cx and the reference capacitance Cr are calculated with respect to applied pressure by using Equations 2-1 and 2-2 described above, and Cx and Cr values are obtained as depicted in FIG. 7. In addition, Cx−Cr values are obtained as depicted in FIG. 8.

For example, if the full scale (FS) of the sensor is assumed to be 100 Pa, a zero point adjustment is relevant to the range of 0 to 10 Pa, which is 10% of FS. For each of the capacitances Cx and Cr, a capacitance observed when no pressure is applied is subtracted from a capacitance observed when pressure is applied. Specifically, a change ΔCx in the pressure-sensitive capacitance Cx and a change ΔCr in the reference capacitance Cr are calculated. Then, plotting the ratio ΔCx/ΔCr as a function of the pressure provides the characteristic curve I depicted in FIG. 9.

Figure 9:
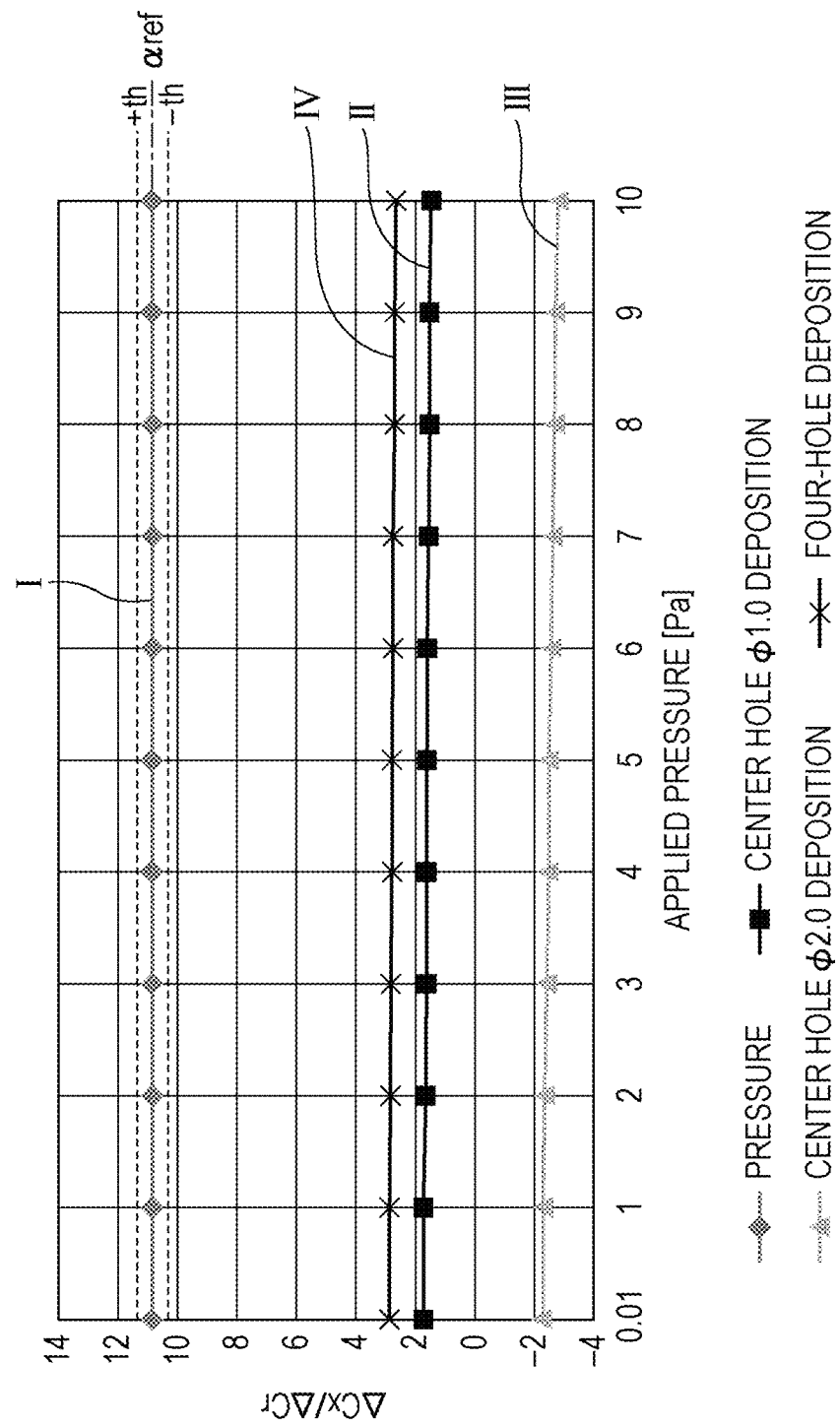
FIG. 9 is a graph illustrating that the ratio ΔCx/ΔCr of the change ΔCx in pressure-sensitive capacitance Cx to the change ΔCr in reference capacitance Cr differs to a great extent for a state in which a deposited film is formed and for a state in which no deposited film is formed in a region of a pressure equal to or less than 10 Pa, which corresponds to 10% of full scale (FS) equal to 100 Pa.

FIG. 9 also depicts, as the characteristic curves II and III, the ratio ΔCx/ΔCr between the differences in simulated values of capacitance when pressure is applied to the diaphragm 101 on which the film 115 has been deposited (as depicted in FIG. 4). The characteristic curve II indicates a case where the diameter of the pressure introduction hole 112 is 1.0 mm, and the characteristic curve III indicates a case where the diameter of the pressure introduction hole 112 is 2.0 mm. FIG. 9 also depicts, as the characteristic curve IV, a case where four pressure introduction holes 112 are disposed in the electrostatic-capacitance pressure sensor 100', which has the structure depicted in FIG. 13.

These results indicate that, for a pressure equal to or less than 10 Pa, which corresponds to 10% of FS, the ratio ΔCx/ΔCr is nearly constant, weakly depending on the pressure, and differs greatly for a state in which a film is deposited (i.e., with a deposit) and for a state in which no film is deposited (i.e., without a deposit). Thus, assuming the ratio ΔCx/ΔCr to be a signal representing a form of deformation, which is caused by pressure, of the diaphragm 101 enables the separation of a zero point shift generated by a cause other than pressure.

More specifically, for example, as depicted in FIG. 9, the reference value αref is set to the ratio during normal operation ΔCx/ΔCr, and a range of −th to +th (range delimited by dotted lines) with respect to the reference value αref is determined. When the zero point of a vacuum gauge has shifted, if the ratio α=ΔCx/ΔCr obtained at the time of pumping to the limit (evacuation to the limit) is not within the range of αref±th, it can be determined that a shift due to a deposit and the like has been generated. In other words, it can be determined that deformation due to a cause other than pressure has been generated in the diaphragm 101.

Figure 10:
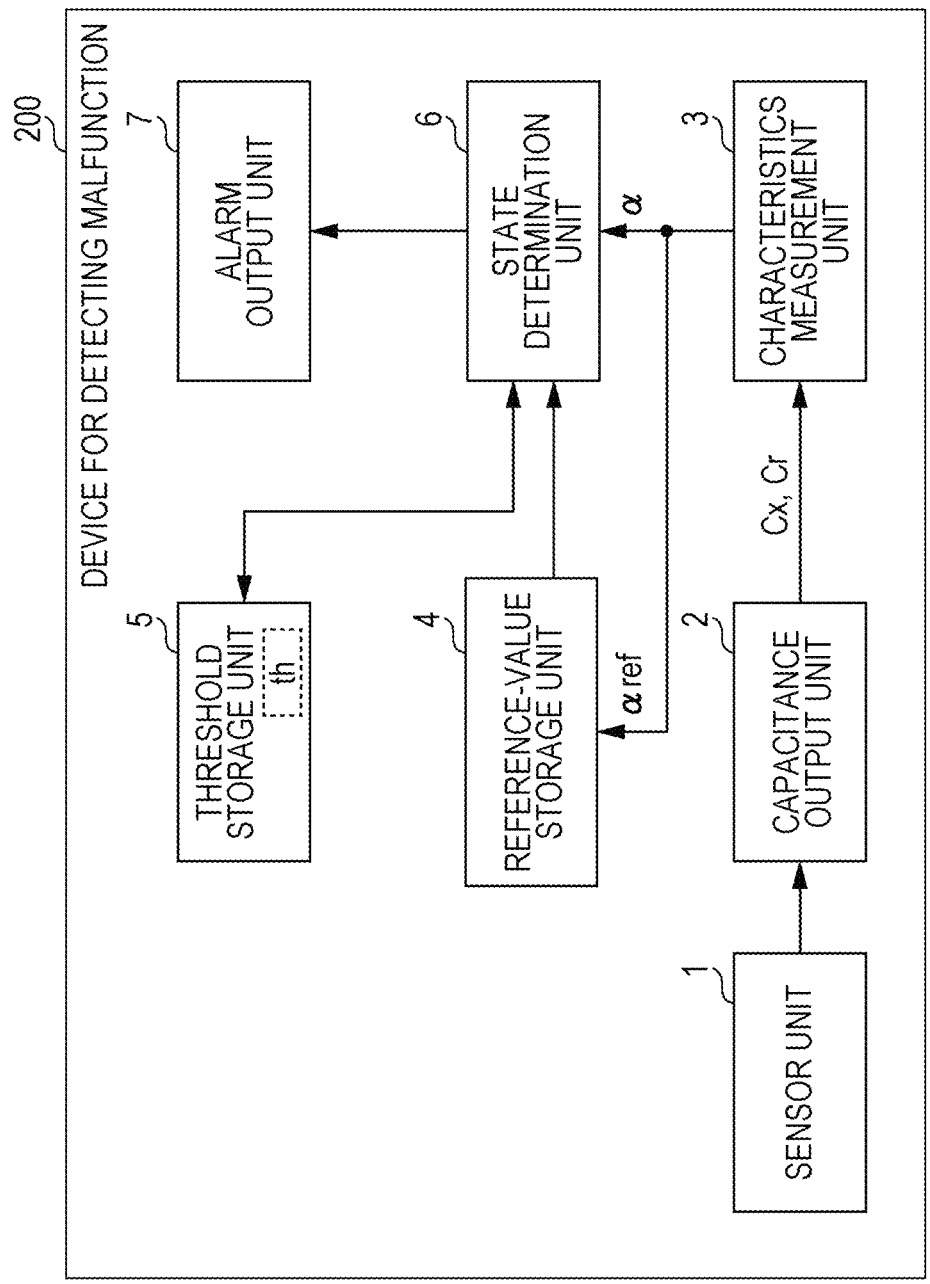
FIG. 10 is a block diagram illustrating a configuration of major components of a device for detecting malfunction of an electrostatic-capacitance pressure sensor according to a first embodiment of the present disclosure.

FIG. 10 is a block diagram illustrating a configuration of major components of a device for detecting malfunction 200 of the electrostatic-capacitance pressure sensor 100 according to a first embodiment of the present disclosure. The device for detecting malfunction 200 is realized by hardware constituted by a processor and a storage device and a program that operates in combination with the hardware and that realizes various functions. The device for detecting malfunction 200 includes a sensor unit 1, a capacitance output unit 2, a characteristics measurement unit 3, a reference-value storage unit 4, a threshold storage unit 5, a state determination unit 6, and an alarm output unit 7.

In the device for detecting malfunction 200, the sensor unit 1 corresponds to the pressure-sensing electrode pair D1 and the reference electrode pair D2 in the electrostatic-capacitance pressure sensor 100 depicted in FIG. 2. In addition, the device for detecting malfunction 200 is installed in a signal processing apparatus provided with the electrostatic-capacitance pressure sensor 100.

Following, referring to the flowcharts depicted in FIGS. 11 and 12, functions will be described in association with operation regarding the capacitance output unit 2, the characteristics measurement unit 3, the reference-value storage unit 4, the threshold storage unit 5, the state determination unit 6, and the alarm output unit 7.

In the present embodiment, when a sensor is characterized before shipping (before operation) of the electrostatic-capacitance pressure sensor 100, not only is the sensor output Cx–Cr simply stored, but also a value of ΔCx/ΔCr, which is the ratio of the change in the pressure-sensitive capacitance Cx to the change in the reference capacitance Cr when a pressure within the measurement range is applied, is stored. The ratio ΔCx/ΔCr serves as an index for malfunction detection.

Figure 11:
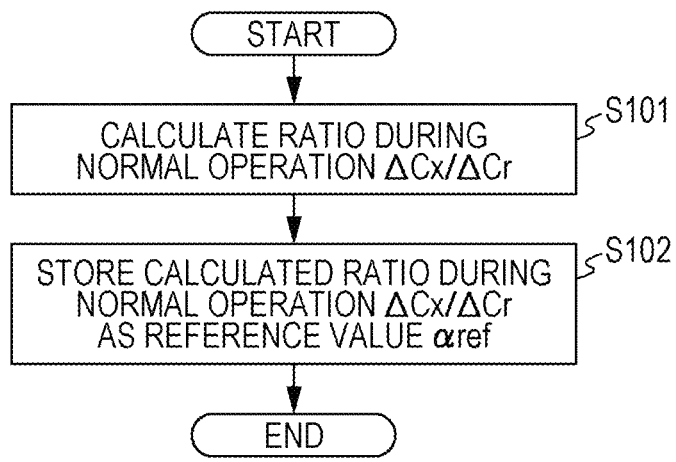
FIG. 11 is a flowchart illustrating processing of the device for detecting malfunction according to the first embodiment before operation.

Specifically, while a pressure within the measurement range is applied, signals generated from the sensor unit 1 are converted into the pressure-sensitive capacitance Cx and the reference capacitance Cr in the capacitance output unit 2, and the ratio ΔCx/ΔCr of the change ΔCx in the pressure-sensitive capacitance Cx to the change ΔCr in the reference capacitance Cr is calculated in the characteristics measurement unit 3 as the ratio during normal operation ΔCx/ΔCr (FIG. 11, step S101). The calculated ratio during normal operation ΔCx/ΔCr is stored in the reference-value storage unit 4 as the reference value αref (step S102).

Figure 12:
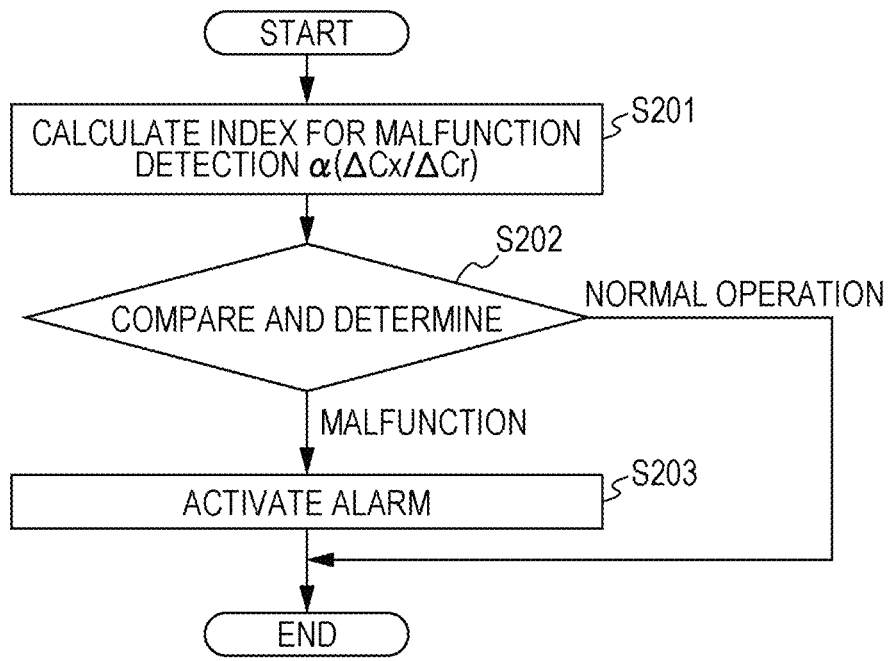
FIG. 12 is a flowchart illustrating processing of the device for detecting malfunction according to the first embodiment during operation.

Next, when determining (during operation) whether a shift in sensor data, which occurs after an actual process, is due to a degradation in the degree of vacuum, signals that are generated from the sensor unit 1 while the sensor unit 1 is evacuated to the limit and kept in vacuum are converted into the pressure-sensitive capacitance Cx and the reference capacitance Cr in the capacitance output unit 2, and the ratio ΔCx/ΔCr of the change ΔCx in the pressure-sensitive capacitance Cx to the change ΔCr in the reference capacitance Cr is calculated in the characteristics measurement unit 3 as an index for malfunction detection α (FIG. 12, step S201). The index for malfunction detection α, which is measured by the characteristics measurement unit 3, is sent to the state determination unit 6.

The state determination unit 6 compares the index for malfunction detection α sent from the characteristics measurement unit 3 with the reference value αref, which is stored in the reference-value storage unit 4. More specifically, the state determination unit 6 reads the threshold th, which is stored in the threshold storage unit 5, checks whether the index for malfunction detection α is in the range of αref±th, and thus determines whether deformation due to a cause other than pressure has been generated in the diaphragm 101 in the electrostatic-capacitance pressure sensor 100 (step S202).

In this case, the state determination unit 6 determines that deformation due to a cause other than pressure has not been generated in the diaphragm 101 if the index for malfunction detection α is in the range of αref±th ("normal operation" in step S202) and determines that deformation due to a cause other than pressure has been generated in the diaphragm 101 if the index for malfunction detection α is outside the range of αref±th ("malfunction" in step S202). The determination result determined in the state determination unit 6 is sent to the alarm output unit 7.

The alarm output unit 7 activates an alarm upon receiving a determination result reporting that deformation due to a cause other than pressure has been generated in the diaphragm 101, that is, the determination result reporting malfunction (step S203).

Second Embodiment: Example of Performing Signal Processing by Using Capacitance Other than Ordinary Cx and Cr In the electrostatic-capacitance pressure sensor 100', which has the structure depicted in FIG. 13, a step portion 116 is formed between the peripheral portion and the central portion on the surface on a pressure introduction chamber 106 side of a diaphragm 101, and the diaphragm 101 is divided into a region S1 on the central-portion side (thin region) and a region S2 on the peripheral-portion side (thick region) at the step portion 116 serving as the boundary. A plurality of pressure introduction holes 112 are located in a pedestal plate 107 so that the openings of the plurality of pressure introduction holes 112 are positioned in the vicinity of the step portion 116 of the diaphragm 101 (in the region S2 on the peripheral-portion side).

Figure 14:
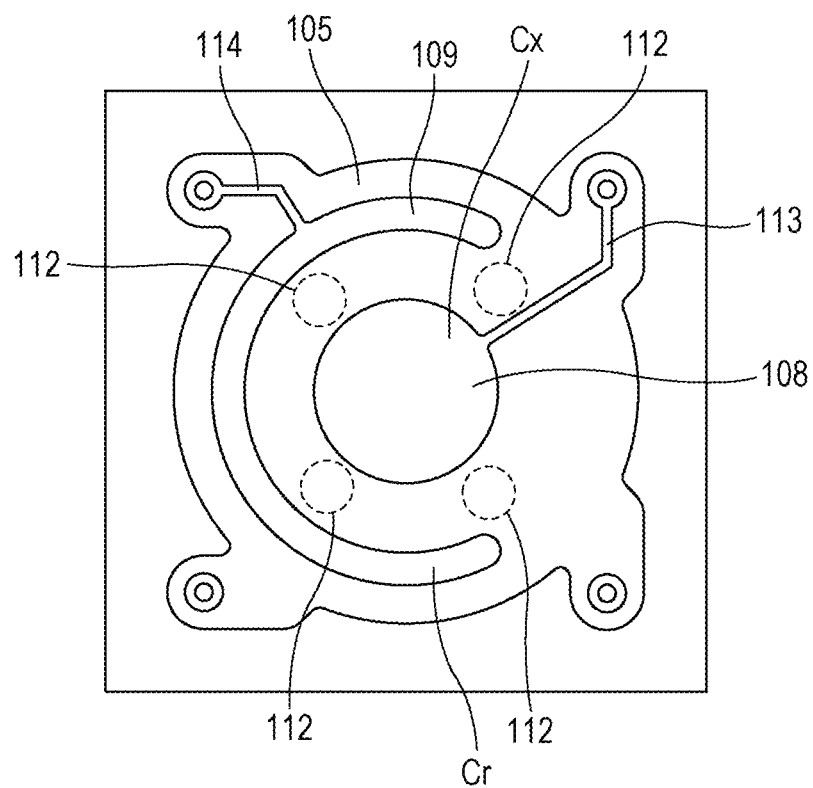
FIG. 14 depicts the arrangement of a pressure-sensing fixed electrode and a reference fixed electrode, which are formed on a sensor pedestal, together with the positions of pressure introduction holes in this electrostatic-capacitance pressure sensor.
Figure 15:
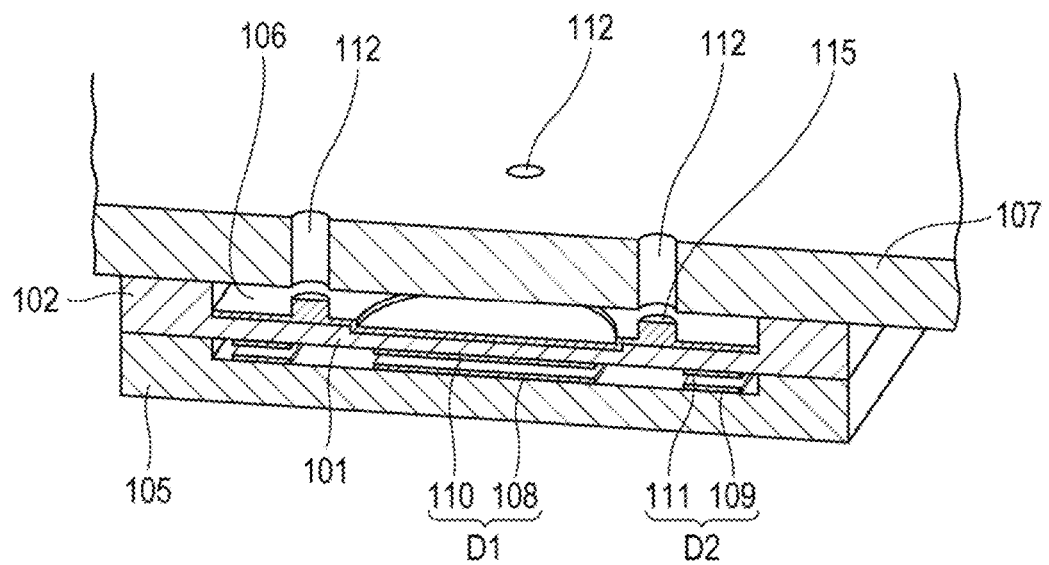
FIG. 15 depicts a state in which a deposited film is formed on the diaphragm of this electrostatic-capacitance pressure sensor.
Figure 16:
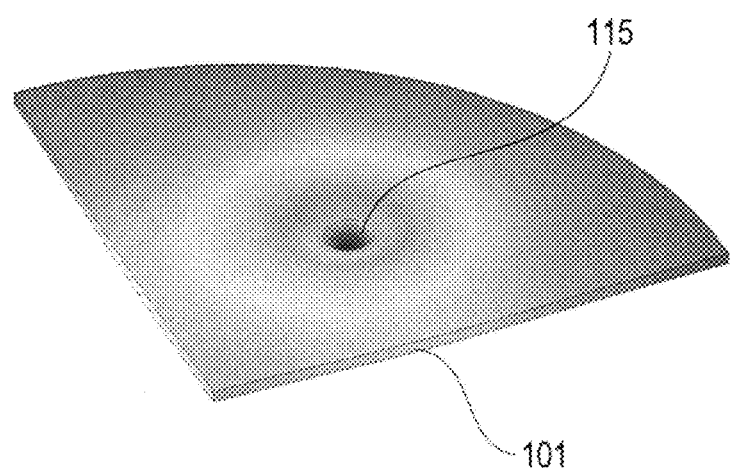
FIG. 16 depicts a calculation result (quarter model) illustrating that a portion that is located in a region on the peripheral-portion side of the diaphragm of this electrostatic-capacitance pressure sensor and that corresponds to a pressure introduction hole deforms to a great extent when the deposition depicted in FIG. 15 occurs.

FIG. 14 depicts the arrangement of a pressure-sensing fixed electrode 108 and a reference fixed electrode 109, which are formed on a sensor pedestal 105, together with the positions of the pressure introduction holes 112 in the electrostatic-capacitance pressure sensor 100'. In this example, the four pressure introduction holes 112 are disposed at equiangular intervals in the region located between the pressure-sensing fixed electrode 108 and the reference fixed electrode 109. In this case, as depicted in FIG. 15, a film 115 is deposited so as to be thicker directly below the four pressure introduction holes 112, which are disposed at equiangular intervals, and portions of the diaphragm 101 corresponding to the pressure introduction holes 112, which are located in the region on the peripheral-portion side, are expected to deform to a greater extent as depicted in FIG. 16.

Figure 17:
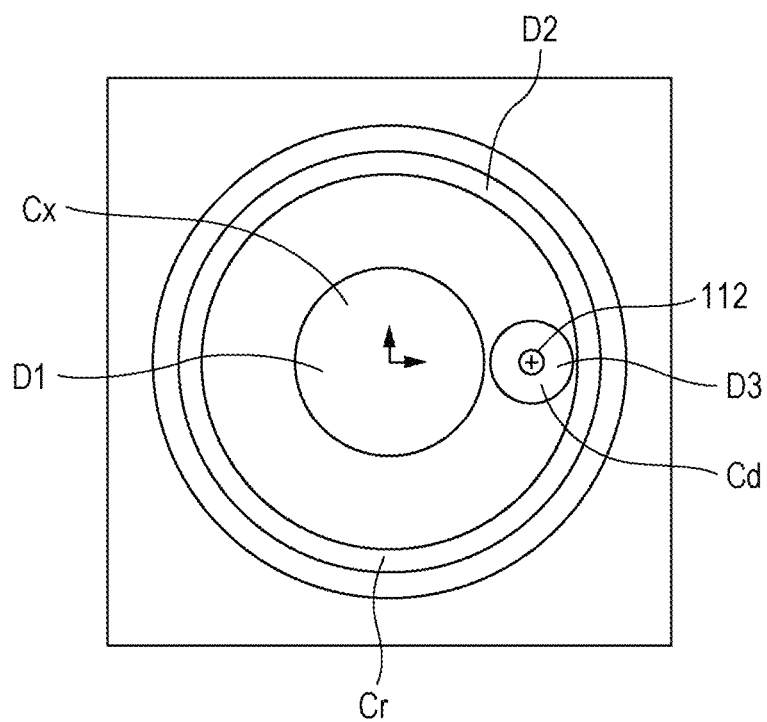
FIG. 17 depicts the arrangement of a pressure-sensing electrode pair, a reference electrode pair, and a deposition-sensing electrode pair in this electrostatic-capacitance pressure sensor.

Thus, in the electrostatic-capacitance pressure sensor 100' of such a structure, as depicted in FIG. 17, a deposition-sensing electrode pair D3 is disposed at a position that corresponds to one of the pressure introduction holes 112, which are located between the pressure-sensing electrode pair D1 and the reference electrode pair D2. The deposition-sensing electrode pair D3 is disposed as a third electrode pair and forms a deposition-sensitive capacitance Cd.

Then, whether deformation due to a cause other than pressure has been generated in the diaphragm 101 is determined by calculating the ratio ΔCd/ΔCr of the change ΔCd in the deposition-sensitive capacitance Cd to the change ΔCr in the reference capacitance Cr obtained at the time of evacuation as an index for malfunction detection β and by comparing the index for malfunction detection β thus calculated with the reference value βref, which represents the index during normal operation.

Figure 18:
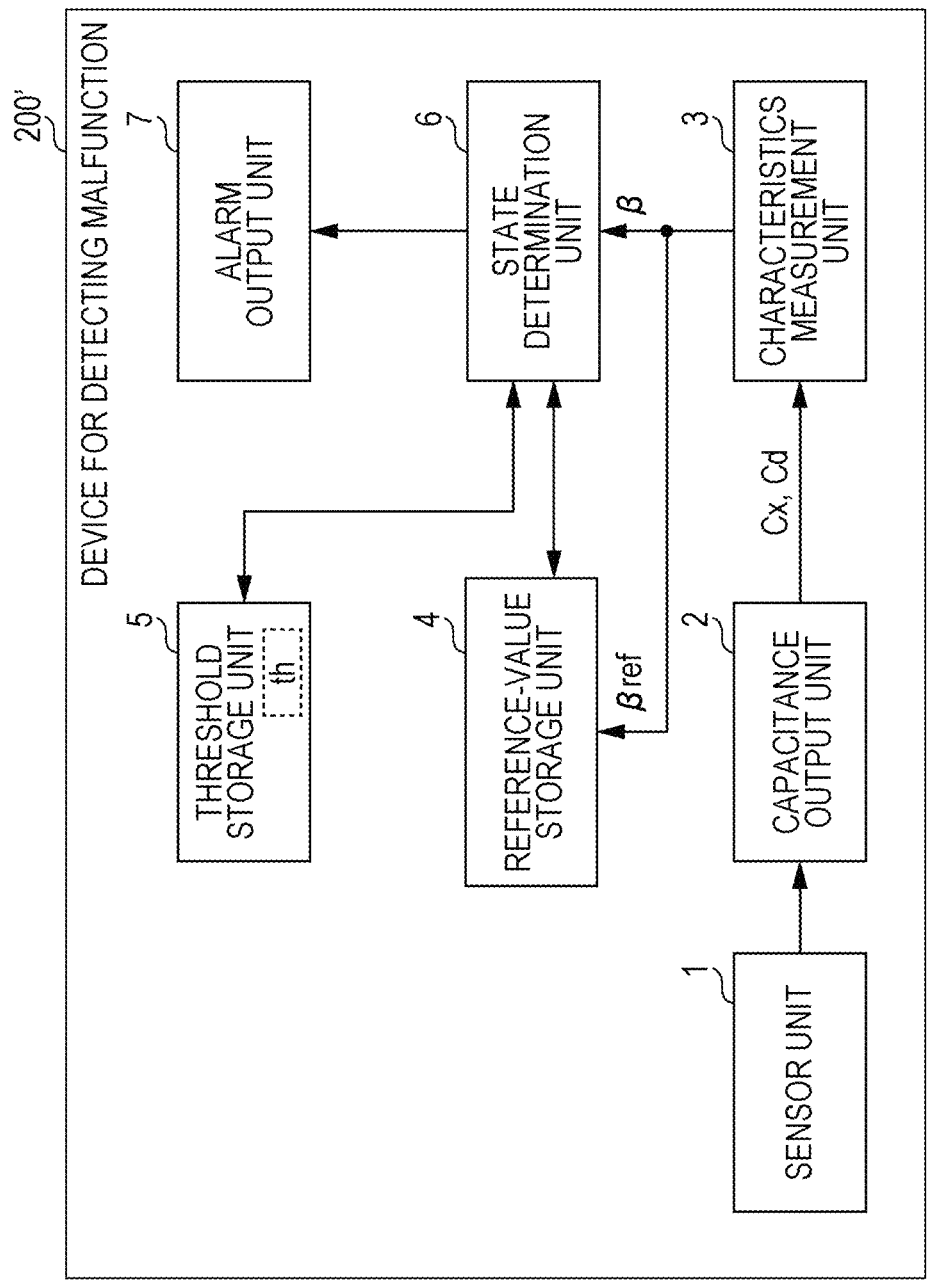
FIG. 18 is a block diagram illustrating a configuration of major components of a device for detecting malfunction of an electrostatic-capacitance pressure sensor according to a second embodiment of the present disclosure.
Figure 19:
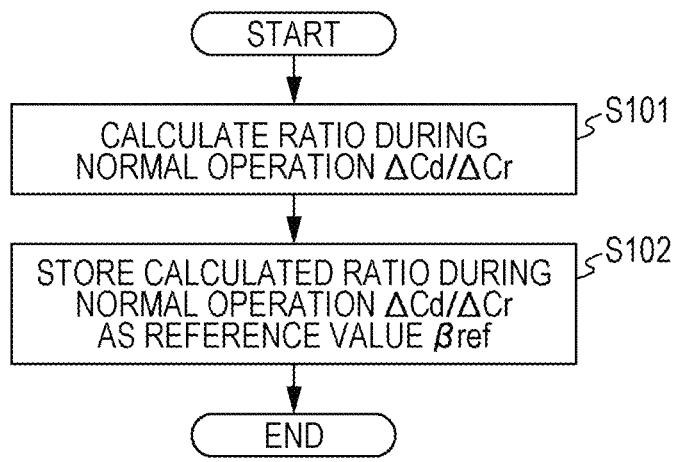
FIG. 19 is a flowchart illustrating processing of the device for detecting malfunction according to the second embodiment before operation.
Figure 20:
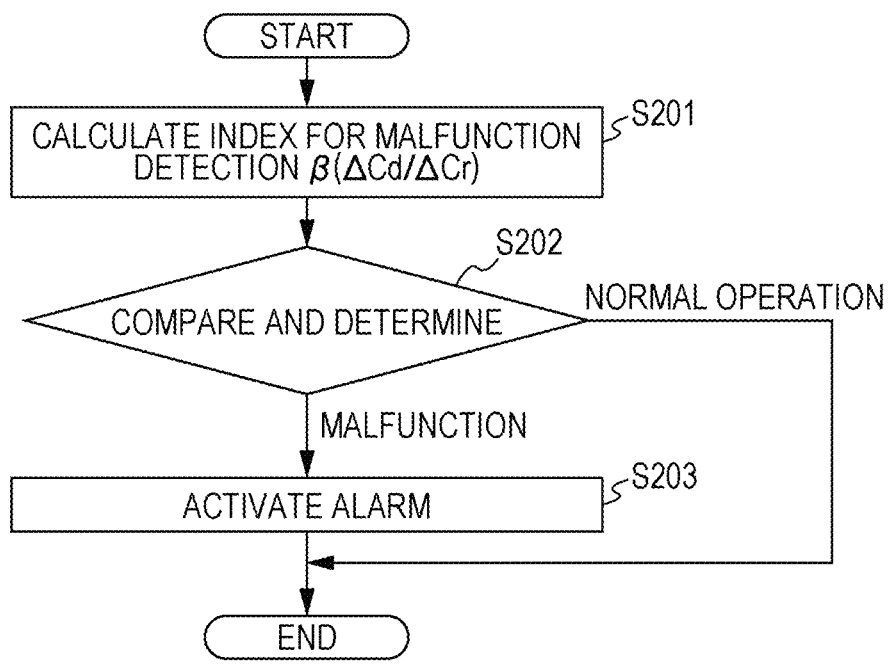
FIG. 20 is a flowchart illustrating processing of the device for detecting malfunction according to the second embodiment during operation.

In the second embodiment, a procedure for alarm activation follows the procedure for alarm activation in the first embodiment. FIG. 18 is a block diagram illustrating a configuration of major components of a device for detecting malfunction 200' and corresponds to FIG. 10. FIG. 19 corresponds to FIG. 11, and FIG. 20 corresponds to FIG. 12. Determining whether deformation due to a cause other than pressure has been generated in the diaphragm 101 in the electrostatic-capacitance pressure sensor 100' is possible also by using the method described in the first embodiment, but adopting the method described in the second embodiment can improve the sensitivity of malfunction detection.

In the second embodiment, the ratio ΔCx/ΔCr of the change ΔCx in the pressure-sensitive capacitance Cx to the change ΔCr in the reference capacitance Cr obtained at the time of evacuation and the ratio ΔCd/ΔCr of the change ΔCd in the deposition-sensitive capacitance Cd to the change ΔCr in the reference capacitance Cr obtained at the time of evacuation may be calculated as the indexes for malfunction detection α and β, respectively. An alarm may be activated if the index for malfunction detection α is outside the range of the reference value αref±th or if the index for malfunction detection β is outside the range of the reference value βref±th.

Expansion of Embodiments

The present disclosure has been described as above with reference to the embodiments, but the present disclosure is not limited to the embodiments described above. Various modifications that can be appreciated by those skilled in the art can be made to the structures and details of the present disclosure within the technical scope of the present disclosure.

What is claimed is:

1. A method for determining a malfunction of an electrostatic-capacitance pressure sensor, the electrostatic-capacitance pressure sensor including a plurality of electrode pairs that each form a capacitance between a corresponding pair of electrodes, the capacitance changing in accordance with displacement of a diaphragm in response to a pressure of a medium to be measured, the malfunction being deformation of the diaphragm due to a cause other than the pressure, the method comprising:
    calculating an index for malfunction detection in accordance with changes in the capacitance of the plurality of electrode pairs; and
    determining whether the malfunction has occurred by comparing the calculated index for malfunction detection with a predetermined reference value that represents a reference index for malfunction detection that was previously calculated when the pressure was in a predetermined operating range, wherein
    the electrostatic-capacitance pressure sensor includes a first electrode pair and a second electrode pair as the plurality of electrode pairs,
    the first electrode pair forms a pressure-sensitive capacitance $Cx$ in a central portion of the diaphragm,
    the second electrode pair forms a reference capacitance $Cr$ in a circumferential portion of the diaphragm, and
    the calculating step further comprises calculating, as the index for malfunction detection, a ratio $\Delta Cx/\Delta Cr$ of (1) a change $\Delta Cx$ in the pressure-sensitive capacitance $Cx$, measured at full vacuum from a first zero point value, to (2) a change $\Delta Cr$ in the reference capacitance $Cr$, measured at full vacuum, from a second zero point value.

2. The method for determining the malfunction of an electrostatic-capacitance pressure sensor according to claim 1, wherein
    the electrostatic-capacitance pressure sensor further includes a third electrode pair as one of the plurality of electrode pairs,
    the third electrode pair forms a deposition-sensitive capacitance $Cd$ at a position corresponding to an inlet through which the medium to be measured is introduced to the diaphragm, and
    the calculating step further comprises calculating, as the index for malfunction detection, a ratio $\Delta Cd/\Delta Cr$ of a change $\Delta Cd$ in the deposition-sensitive capacitance $Cd$, measured at full vacuum, from a third zero point value, to a change $\Delta Cr$ in the reference capacitance $Cr$.

3. The method for detecting malfunction of an electrostatic-capacitance pressure sensor according to claim 2, further comprising
    calculating the predetermined reference value as a ratio of a change in the deposition-sensitive capacitance $Cd$ to a change in the reference capacitance $Cr$ when the pressure is in the predetermined operating range.

4. The method for detecting malfunction of an electrostatic-capacitance pressure sensor according to claim 2, further comprising
    measuring the third zero point value at a previous time, prior to a time of measuring $\Delta Cd$.

5. The method for determining the malfunction of an static-capacitance pressure sensor according to claim 1, further comprising:
    outputting an alarm when it is determined in the determining step that the malfunction has occurred.

6. The method for determining the malfunction of an electrostatic-capacitance pressure sensor according to claim 1,
    wherein base components that constitute the electrostatic-capacitance pressure sensor are made of sapphire, alumina ceramics, glass, silicon, nickel alloy, or stainless steel.

7. The method for determining the malfunction of an electrostatic-capacitance pressure sensor according to claim 1, further comprising
    calculating the predetermined reference value as a ratio of a change in the pressure-sensitive capacitance $Cx$ to a change in the reference capacitance $Cr$ when the pressure is in the predetermined operating range.

8. The method for detecting malfunction of an electrostatic-capacitance pressure sensor according to claim 1, further comprising
    measuring the first zero point value and the second zero-point value at a previous time, prior to a time of measuring $\Delta Cx$ and $\Delta Cr$.

9. A method for determining a malfunction of an electrostatic-capacitance pressure sensor, the electrostatic-capacitance pressure sensor including a plurality of electrode pairs that each form a capacitance between a corresponding pair of electrodes, the capacitance changing in accordance with displacement of a diaphragm in response to a pressure of a medium to be measured, the malfunction being deformation of the diaphragm due to a cause other than the pressure, the method comprising:
    calculating an index for malfunction detection in accordance with changes in the capacitance of the plurality of electrode pairs; and
    determining whether the malfunction has occurred by comparing the calculated index for malfunction detection with a predetermined reference value that represents a reference index for malfunction detection that was previously calculated when the pressure was in a predetermined operating range, wherein
    the electrostatic-capacitance pressure sensor includes a first electrode pair and a second electrode pair as the plurality of electrode pairs,
    the first electrode pair forms a deposition-sensitive capacitance $Cd$ at a position corresponding to an inlet through which the medium to he measured is introduced to the diaphragm,
    the second electrode pair forms a reference capacitance $Cr$ in a circumferential portion of the diaphragm, and
    the calculating step further comprises calculating, as the index for malfunction detection, a ratio $\Delta Cd/\Delta Cr$ of (1) a change $\Delta Cd$ in the deposition-sensitive capacitance $Cd$, measured at full vacuum, from a first zero point value, to (2) a change $\Delta Cr$ in the reference capacitance $Cr$, measured at full vacuum, from a second zero point value.

10. The method for detecting malfunction of an electrostatic-capacitance pressure sensor according to claim 9, further comprising
calculating the predetermined reference value as a ratio of a change in the deposition-sensitive capacitance Cd to a change in the reference capacitance Cr when the pressure is in the predetermined operating range.

11. The method for detecting malfunction of an electrostatic-capacitance pressure sensor according to claim 9, further comprising
measuring the first zero point value and the second zero-point value at a previous time, prior to a time of measuring $\Delta Cd$ and $\Delta Cr$.

12. A device for determining a malfunction of an electrostatic-capacitance pressure sensor, the device being configured to determine a malfunction of an electrostatic-capacitance pressure sensor including a plurality of electrode pairs that each form a capacitance between a corresponding pair of electrodes, the capacitance changing in accordance with displacement of a diaphragm in response to a pressure of a medium to be measured, the malfunction being deformation of the diaphragm due to a cause other than the pressure, the device comprising:
processing circuitry configured to
calculate an index for malfunction detection in accordance with changes in capacitance of the plurality of electrode pairs, and
determine whether the malfunction has occurred by comparing the calculated index for malfunction detection with a predetermined reference value that represents a reference index for malfunction detection that was previously calculated when the pressure was in a predetermined operating range, wherein
the electrostatic-capacitance pressure sensor includes a first electrode pair and a second electrode pair as the plurality of electrode pairs,
the first electrode pair forms a pressure-sensitive capacitance Cx in a central portion of the diaphragm,
the second electrode pair forms a reference capacitance Cr in a circumferential portion of the diaphragm, and
the processing circuity is further configured to calculate, as the index for malfunction detection, a ratio $\Delta Cx/\Delta Cr$ of (1) a change $\Delta Cx$ in the pressure-sensitive capacitance Cx, measured at full vacuum, from a first zero-point value, to (2) a change $\Delta Cr$ in the reference capacitance Cr, measured at full vacuum, from a second-zero point value.

13. The device of to claim 12, wherein the processing circuitry is further configured to
calculate the predetermined reference value as a ratio of a change in the pressure-sensitive capacitance Cx to a change in the reference capacitance Cr when the pressure is in the predetermined operating range.

14. The device of claim 12, wherein the processing circuitry is further configured to measure
the first zero point value and the second zero-point value at a previous time, prior to a time of measuring $\Delta Cx$ and $\Delta Cr$.

* * * * *